[11] 3,550,686

[72] Inventor John A. Knox
 Duncan, Okla.
[21] Appl. No. 803,413
[22] Filed Feb. 28, 1969
[45] Patented Dec. 29, 1970
[73] Assignee Halliburton Company
 Duncan, Okla.
 a corporation of Delaware

[54] UTILIZATION OF HIGH STRENGTH ACID ON DOLOMITE
11 Claims, No Drawings

[52] U.S. Cl. .................................................. 166/307
[51] Int. Cl. .......................................... E21b 43/27
[50] Field of Search .................................. 166/307, 305, 281, 282

[56] References Cited
UNITED STATES PATENTS

| | | | |
|---|---|---|---|
| 3,142,335 | 7/1964 | Dill et al. | 166/307X |
| 3,388,744 | 6/1968 | Fincher et al. | 166/307X |
| 3,441,085 | 4/1969 | Gidley | 166/307 |
| 3,470,959 | 10/1969 | Kruez et al. | 166/307 |

OTHER REFERENCES

Kingston, " Acidizing Handbook," Gulf Publishing Company, Houston, Texas, 1947, (pp. 17, 18, 21-23, 51, 55-59, 87, and 88 relied on.) TN 871 K5 Copy in 166-307

Harris et al, " High-Concentration Hydrochloric Acid Aids Stimulation Results in Carbonate Formations," Journal of Petroleum Technology, Oct. 1966, (pp. 1291-1296) Copy in 166-307

*Primary Examiner*—Stephen J. Novosad
*Attorney*—John Tregoning

ABSTRACT: Acidizing of wells and other earthen formations is accomplished by alternately injecting into the formation a high-strength acid and water or a low-strength acid.

UTILIZATION OF HIGH STRENGTH ACID ON DOLOMITE

This invention relates to treating of wells and earthen formations with acid, particularly fracture acidizing. For many years, the maximum concentration of hydorchloric acid used for well stimulation was about 15 percent. This limit on acid concentration resulted because the corrosion inhibitors available broke down very rapidly in more concentrated hydrochloric acid and corrosion was sometimes excessive. Use of 15 percent hydrochloric acid continued even after corrosion inhibitors were improved, so that more concentrated acid solutions could be used. However, in recent years, interest in using more concentrated acid solutions has increased.

At present, it is generally believed that the use of hydrochloric acid in concentrations of about 30 percent will significantly improve fracture acidizing results. It has been suggested that the concentrated acid reacts more vigorously and has a longer reaction time resulting in higher fracture flow capacity than can be obtained with the same volume of lower concentration acid. As a result of these advantages, hydrochloric acid concentrations of about 30percent are now commonly used for well stimulation.

It has now been found that certain difficulties are encountered when using concentrated acid. It has been observed that the reaction of concentrated acid with formation carbonates may completely stop resulting in wasted acid and return of corrosive fluid to the well bore. Furthermore, plugging of the formation may occur when concentrated acid is used.

It has been discovered that when dolomite and similar material containing calcium and magnesium carbonates is treated with hydrochloric acid, a reaction product, tachyhydrite, having the formula $CaMg_2Cl_6 \cdot 12 H_2O$ is formed. This material is insoluble in concentrated hydrochloric acid. The tachyhydrite may form as a greasy or sticky film on the fracture face. However tachyhydrite may also occur in a more granular form which may flow down the fracture and act as a plugging agent when the well is put back on production. If the tachyhydrite deposit can bridge in the fracture and there are no fluids which will dissolve this tachyhydrite bridge, serious plugging may be encountered.

Despite the disadvantages of tachyhydrite formation, it is desirable to use concentrated hydrochloric acid because of the advantages outlined above.

It is thus an object of the present invention to provide a method of acidizing an earthen formation.

It is a further object of the invention to provide a method of acidizing an earthen formation with concentrated hydrochloric acid.

It is yet another object of the present invention to provide a method of minimizing the adverse effects of tachyhydrite formation during the acidizing of a well.

These and other objects of the present invention are accomplished by alternately treating an earthen formation with strong acid and water or weak acid.

The present invention is applicable to the treatment of dolomite and similar carbonate containing formations. Typical formations may contain a major amount of dolomite and minor amounts of anhydrite, quartz, feldspars, calcite, kaolinite, Illite, etc.

Tachyhydrite has the formula $CaMg_2Cl_6 \cdot 12 H_2O$ and is formed by the reaction of hydrochloric acid with dolomite, which has the formula $CaMg(CO_3)_2$. Tachyhydrite is apparently formed when hydrochloric acid, even in very low concentrations, is contacted with dolomite. However, the formation of tachyhydrite is much more rapid at hydrochloric acid concentrations above about 15percent. Thus, in an experimental determination, it was found that 80 pounds tachyhydrite per 100 gallons of acid was formed when dolomite was treated with 15 percent HC1, whereas 500 pounds tachyhydrite per 1,000 gallons was formed with 30 percent HC1. Thus, it can be seen that tachyhydrite formation is a much more severe problem when operating at higher acid concentrations which are otherwise more desirable.

The benefits of using concentrated hydrochloric acid at strengths of about 30 percent can be realized and the undesirable effects of tachyhydrite formation can be minimized by operating in accordance with the present invention. It has been found that strong hydrochloric acid can be effectively utilized in acidizing treatments if the formation is alternately treated with strong hydrochloric acid and water, or a weak acid. Thus, during the course of an acidizing treatment, the flow of strong acid to the formation would be interrupted with a weak acid, or with water.

The weak acid may be hydrochloric acid at a concentration of about 15 percent or less. Additionally, weak acids and especially organic acids, such as acetic, formic, etc., may be used in concentrations of up to about 20 percent. The weak acid should provide a means of dissolving a large portion of the tachyhydrite formed during treatment with concentrated hydrochloric acid. The solubility of tachyhydrite in water is quite high, and thus it may be desirable to use water rather than a weak acid. Of course, water will have a greater diluting effect upon the concentrated hydrochloric acid, and thus tend to counteract some of the advantages in using the concentrated hydrochloric acid. However, it has surprisingly been found that operations according to the present invention are much more effective than merely diluting the concentrated or strong acid, and that it gives substantially all the benefits obtained with strong acid.

Preferably, there should be a preflush and afterflush of water or weak acid when acidizing with a strong acid. Additionally, weak acid or. water should intermittently be introduced into the formation the course of the acid treatment. The total amount of weak acid or water which is introduced into the formation during the course of the acid treatment may vary widely. However, it has generally been found satisfactory to use a volume of water or weak acid which is approximately equal to the volume of strong acid being used in the acidizing treatment. The size and frequency of the slugs of weak acid or water may vary, although at least two separate slugs of weak acid or water are usually employed. Preferably, there should be at least about four slugs of weak acid or water introduced during the course of the acidizing treatment.

The volume of the preflush and overflush treatment with weak acid or water may vary widely. However, the preflush and overflush volume are each usually approximately equal to the volume of the acid used in the treatment.

The present invention can be more readily understood by referring to the following examples.

EXAMPLE 1

This example illustrates the formation of tachyhydrite as the result of the action of hydrochloric acid upon dolomite. Cores taken from an oil well formation containing San Andres dolomite were treated with 30 percent HC1. The resulting cores were partially coated with a sticky gray colored material which reduced the surface area of the acid soluble portion of the core and consequently produced extremely long reaction times. The material coating the core plugs was identified by X-ray diffraction as tachyhydrite, $CaMg_2Cl_6 \cdot 12 H_2O$.

EXAMPLE 2

This example illustrates the solubility of tachyhydrite in various concentrations of hydrochloric acid. Two hundred milliliter aliquots of various acid solutions were spent on an excess of Knox dolomite. The undissolved dolomite and residue were filtered from the spent acid, washed with acetone, and dried in an oven set at 140° F. The dried material was weighed and then washed with 200 milliliters of distilled water, washed with acetone, dried in a 140° F. oven and reweighed. The difference in weight was considered as tachyhydrite. The results are set forth in table I below.

TABLE I

| Percent HCl. | Lbs. Tachyhydrite/1,000 gal. reacted acid |
|---|---|
| 5 | 23.4 |
| 10 | 47.6 |
| 15 | 80.7 |
| 20 | 174.0 |
| 25 | 319.6 |
| 30 | 505.3 |

EXAMPLE 3

This example describes the composition of various dolomites and illustrates the characteristics of the reaction of these dolomites with hydrochloric acid. The analysis of various dolomites by atomic absorption is set forth in table II.

The various dolomites were reacted with hydrochloric acid at concentrations of 10 percent, 15 percent and 30 percent, and the resulting cores were examined for the presence of tachyhydrite. These results are also set forth in table II.

The reaction time of 30 percent HC1 with various dolomite cores was determined by treating the cores at 200° F. and 1,5000 p.s.i,s using a simulated 0.24 inch fracture, in accordance with the method set forth in U.S. Pat. No. 3,319,714 to John A. Knox, the disclosure of which is incorporated herein by reference. The reaction times given are the times required for the 30 percent HC1 to react to a residual concentration of 3.2 percent. The reaction times are set forth.

with water. This water can be fresh or can contain salt. The amount of salt should be less than 5 percent by weight for most well conditions. The reaction time for 30 percent acid on the formation is found to be 100 minutes, which means that the first 30 percent acid which hits the formation can be pumped for 100 minutes before it reaches a concentration of 3.2 percent HC1. The injection rate is established at 10 bbls./minute. This will allow 1000 bbls. (42,000 gals.) of fluid to be pumped from the time the 30 percent acid reaches the perforations. It is experimentally determined that maximum fracture flow capacity can be obtained by contacting the formation with 30 percent acid for 50 minutes. Tests further indicate an etching time of 50 minutes would develop a fracture flow capacity of 75,000 millidarcy feet. Five hundred barrels of acid (21,000 gals.) at 10 bbls./minute are required to provide the 50 minute contact time. An additional 500 bbls. of water or dilute brine or acid will be required to provide the additional 50 minutes spending time required for the initial portion of the acid entering the fracture to spend to 3.2 percent.

A preflush of 7,000 gallons of water or one-third the volume of the 30 percent HCI is used to make sure no tachyhydrite will be left at the extremity of the fracture (also it is useful to cool down the tubing to minimize corrosion). Ten percent acetic acid which has been found to have a reaction time of 200 minutes and could also have been utilized both to provide additional fracture extension and etching as well as dissolve tachyhydrite.

The 30 percent acid is then introduced in the equal portion with slugs of an equal volume of water introduced between acid slugs.

TABLE II

| Dolomite | Atomic absorption analysis for CaCO3 and MgCO3 | | | Results of tests for Tachyhydrite using: HCl reaction | | | |
|---|---|---|---|---|---|---|---|
| | Percent CaCO3 | Percent MgCO3 | Percent acid insoluble | 30% HCl | 15% HCl | 10% HCl | Time, min. |
| Kaluth | 50.5 | 40.9 | 8.6 | Positive | | | 42 |
| Knox | 57.5 | 34.7 | 7.8 | do | Positive | Positive | |
| San Andres | 54.0 | 35.4 | 10.6 | do | | | |
| Flickinger | 53.0 | 40.3 | 6.7 | do | Positive | Positive | 57 |
| Winkler | 52.5 | 41.6 | 5.9 | Negative | | | |
| Kosota | 49.9 | 38.2 | 11.9 | Positive | Positive | Positive | |
| Union Logsdon | 57.4 | 31.2 | 11.4 | do | do | do | 130 |
| Rat Bed (11,226′) | 49.9 | 39.9 | 10.2 | do | do | do | 200 |
| Rat Bed (11,176′) | 37.5 | 26.0 | 36.7 | | | | |
| Clear Fork | 67.4 | 34.7 | 0.0 | Positive | | | 245 |

EXAMPLE 4

This example illustrates the plugging resulting from the treatment of dolomite with hydrochloric acid. Kaluth dolomite was treated with 15 percent and 30 percent hydrochloric acid by first pumping kerosene through the core at 76° F. and 1,000 p.s.i. The system was then adjusted to 200° F. and back pressure regulators were placed in the system so that a differential pressure across the core developed when the pumping pressure exceeded 1,000 p.s.i. A back pressure regulator was placed in the line from the pump so that the pump pressure would not exceed 1,600 p.s.i. The results are set forth in table III.

EXAMPLE 5

A well is treated according to the present invention as follows.

The tubing with a packer attached is run into the well.

A small volume of 15 percent HC1 (approximately 500 gals. or 12 bbls.) is spotted over the perforations by pumping down the tubing and circulating the fluid in the hole back up to the annulus between the tubing and casing. When the acid reaches the spot and before any can be circulated past the packer, the packer is set. When the packer is set and pressure is applied to the casing the acid is pumped into the formation to breakdown the perforations and establish the injection rate and treating pressure. The spearhead of acid is followed down the tubing The job is then performed as follows:

TABLE IV

| Pumping time, min.: | Volume, bbls./gals. |
|---|---|
| 1.2 | 12/[1] 500 |
| 16.8 | 168/[2] 7,000 |
| 16.8 | 168/[3] 7,000 |
| 16.8 | 168/[4] 7,000 |
| 16.8 | 168/7,000 |
| 16.8 | 168/7,000 |
| 16.8 | 168/7,000 |
| 16.8 | 168/7,000 |
| 118 | 1,180/[5] 49,500 |

[1] 15% HCl.
[2] Water, brine or acetic acid, spearhead.
[3] Of 30% HCl.
[4] Water.
[5] Only 42,000 gals. after spearhead.

Smaller volumes of water could be used to dissolve the tachyhydrite but these volumes are convenient to allow full utilization of the longer reaction time and to create the maximum etching and extend the fracture as much as possible.

The treatment volume, pump rate, fluid efficiency and flow capacity along with formation conditions can be used to calculate an Acid Plan as follows:

TABLE V

| | |
|---|---:|
| Created Area (Sq. Ft.) equals | 84,785 |
| Fracture Length (Ft.) do | 2,119.64 |
| Production Fracture Length (Ft.) do | 1,589.73 |
| Fracture Width (In.) do | 0.1333 |
| Pumping Time (Min.) do | 117.857 |
| Production Increase (Fold) do | 3.388 |

The foregoing examples are merely illustrative of the present invention, and should not be considered as limiting the scope thereof. For example, the present invention is applicable to any earthen formation which produces tachyhydrite when treated with an acid such as hydrochloric acid. It should be understood that the concentration of the strong hydrochloric acid may be varied as required for the particular purpose. Furthermore, the amount of weak acid or water which is intermittently introduced into the formation during the acid treatment may be varied as required for the particular treatment involved. Thus, it can be seen that the invention should be limited only by the lawful scope of the appended claims which follow.

I claim:

1. The method of avoiding the retarding effects of the formation of tachyhydrite when treating a subterranean formation containing calcium carbonate and magnesium carbonate with a strong hydrochloric acid comprising the step of introducing alternately into said formation hydrochloric acid and a tachyhydrite dissolving fluid selected from the group consisting of water and acids having a concentration of 15 percent or less by weight, said hydrochloric acid being present in a strength of from about 20 percent to about 38 percent by weight.

2. The method of claim 1 wherein said hydrocholoric acid is present in a concentration of from about 25 percent to about 33 percent by weight.

3. The method of claim 1 wherein said tachyhydrite dissolving fluid is water.

4. The method of claim 1 wherein the tachyhydrite dissolving fluid is an organic acid, said acid having a concentration of 15 percent or less by weight.

5. The method of claim 1 wherein the tachyhydrite dissolving fluid is hydrochloric acid, said acid having a concentration of 15 percent or less by weight.

6. The method of claim 1 wherein said tachyhydrite dissolving fluid is selected from the group consisting of hydrochloric acid and organic acids, said acids being present in a concentration of 15 percent or less by weight.

7. The method of enhancing the producing characteristics of a hydrocarbon-producing formation containing calcium carbonate and magnesium carbonate comprising the step of introducing alternately into said formation hydrochloric acid and a tachyhydrite dissolving fluid selected from the group consisting of water and acids having a concentration of 15 percent or less by weight, said hydrochloric acid being present in a strength of from about 20 percent to about 38 percent by weight.

8. The method of claim 7 wherein said hydrochloric acid is present in a concentration of from about 25 percent to about 33 percent by weight.

9. The method of claim 7 wherein the tachyhydrite dissolving fluid is an organic acid, said acid having a concentration of 15 percent or less by weight.

10. The method of claim 7 wherein the tachyhydrite dissolving fluid is hydrochloric acid, said acid having a concentration of 15 percent or less by weight.

11. The method of claim 7 wherein said tachyhydrite dissolving fluid is selected from the group consisting of hydrochloric acid and organic acids, said acids being present in a concentration of 15 percent or less by weight.